United States Patent [19]

Carmen

[11] 4,412,248
[45] Oct. 25, 1983

[54] ULTRASONIC IMAGE STORAGE DEVICE AND METHOD

[75] Inventor: Ralph H. Carmen, Lebanon, N.J.

[73] Assignee: Technicare Corporation, Solon, Ohio

[21] Appl. No.: 338,730

[22] Filed: Jan. 11, 1982

[51] Int. Cl.³ .............................................. H04N 7/18
[52] U.S. Cl. ...................................... 358/112; 73/602; 128/660; 364/575
[58] Field of Search .................. 358/112; 364/575; 73/602; 128/660

[56] References Cited

U.S. PATENT DOCUMENTS 3,792,194  2/1974  Wood .................................. 358/112
4,271,389  6/1981  Jacobi .................................. 73/602

FOREIGN PATENT DOCUMENTS

2747405  8/1978  Fed. Rep. of Germany ...... 358/112

*Primary Examiner*—Howard Britton

[57] ABSTRACT

An improved ultrasonic imaging system and method are provided for medical diagnostic purposes. In order to store additional digital ultrasonic imaging information in a limited memory, a first digital signal representative of a video input signal is provided. The first digital signal comprises a series of digital amplitude samples of the transverse component of the input signal. A second series of samples is provided from the first series. Each element of the second series is the arithmetic average of a group of elements of the first series. The second series of elements is stored. Since the number of elements of the second series is less than the number of elements of the first series, memory density of the transverse component of the input signal is decreased.

15 Claims, 8 Drawing Figures

ULTRASONIC IMAGE STORAGE DEVICE AND METHOD

BACKGROUND OF THE INVENTION

The present invention relates, in general, to ultrasonic imaging, and, in particular, relates to an improved technique and device for storing and retrieving ultrasonic images of the type used in medical diagnostics.

Ultrasonic imaging has found increased utility in the field of medical diagnosis. For example, ultrasonic imaging is utilized extensively for the detection and diagnosis of mammarian cancer. It is also utilized to ascertain various stages of fetal development. A major problem encountered with ultrasonic imaging has been the need to find a suitable technique for storing and retrieving the vast quantities of data generated when ultrasonic imaging techniques are employed. One technique employed for storing such data is to store information on photographic film. However, a typical mammarian scan for a single patient may comprise as many as sixty pages of photographs per patient with four photographs per page. Because of the unwieldly nature of such photographic records, less than a complete set of records may be collected and maintained for a given patient. Since record selection is generally done by a technician, the technician's judgment as to which data should be collected and which discarded may be substituted for that of the physician.

To alleviate the disadvantage of unwieldy photographic records of ultrasonic imaging, digital storage of such images has been proposed. However, ultrasonic imaging generates large quantities of digital data. While digital data storage techniques are available to store large quantities of digital data, retrieving such information may be sufficiently time consuming so as to be undesirable for a busy physician. One alternative is to provide a minimum digital storage capacity and to simply collect less data. In this manner, information retrieval time may be minimized but fewer than the optimum number of records per patient may be stored. Alternatively, if many records per patient are stored, but with data density for each record reduced, the image resolution for each record may be less than optimum.

It would be desirable to provide an improved ultrasonic image data storage and retrieval technique and device which utilizes minimum digital storage capacity.

It would be still further desirable to provide such an ultrasonic image storage and retrieval device and technique which utilizes minimum storage capacity and yet which is capable of storing all imaging data which is diagnostically significant.

It would be still further desirable to provide such an ultrasonic image storage and retrieval device and technique having the capability for information retrieval in a short period of time.

It would be still further desirable to provide such a device and technique which permits the storage of more patient records in a memory of a given size without appreciable loss of resolution.

SUMMARY OF THE PRESENT INVENTION

The foregoing needs are met by the provision of a new ultrasonic image storage device and technique which takes advantage of the fact that an ultrasonic image is more highly variable in a direction along the axis of the ultrasonic transducer than in a direction transverse to that axis. Thus, the frequency of the axial component of a video signal representing an ultrasonic image is higher than the frequency of the transverse component. Because the frequency of the transverse component of the video signal is relatively low, a storage and retrieval technique may be employed wherein the memory density allocated for storage of the transverse component is decreased without loss of axial resolution and without noticeable loss of transverse resolution.

In accordance with the present invention, a method of storing and retrieving an ultrasonic image is disclosed in which an analog video input signal is provided. The analog video input signal is converted to a first series of digital amplitude samples. A second series of digital amplitude samples is formed from the first series, with each element of the second series being the average of a group of elements in the first series. The second series of samples is then stored. Since the second series of samples comprises fewer elements than the first series of samples, memory density may be decreased. However, since the second series of samples is the average of elements from the first series of samples, the second series of samples provides a reasonable approximation of the original video input signal. Since the frequency of the transverse component of the ultrasonic image being stored is relatively low, such an approximation is sufficiently accurate to faithfully reproduce an ultrasonic image.

BRIEF DESCRIPTION OF THE DRAWINGS

The present invention will be more fully understood by reference to the accompanying drawings, in which.

DETAILED DESCRIPTION OF THE PREFERRED EMBODIMENT

Figure 1:
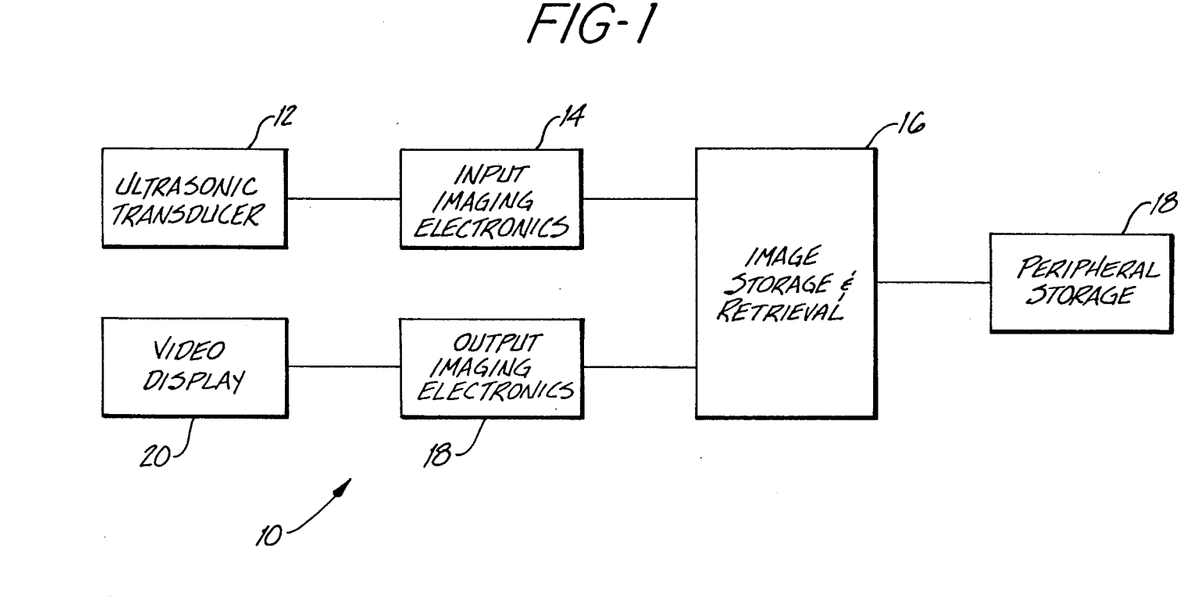
FIG. 1 is a general block diagram of an ultrasonic imaging system employing the novel image storage and retrieval means of the present invention.

Referring now to FIG. 1, the ultrasonic imaging system of the present invention is shown generally at 10. The imaging system 10 of the present invention has the capability of storing 240 records or frames of information per patient. The ultrasonic imaging system 10 of the present invention employs an ultrasonic transducer 12 of conventional type. Signals received by the ultrasonic transducer 12 are directed to input imaging electronics 14. The input imaging electronics 14 are also of conventional design. The input imaging electronics 14 provides an analog video input signal which is representative of the ultrasonic image detected by the transducer 12. 176 lines of the analog video input signal constitute one frame or record of information from a given patient. The analog video input signal emanating from the input electronics 14 is directed, in accordance with the present invention, to an image storage and retrieval circuit 16 of the present invention, which will be described in detail in connection with FIG. 2 below. The image storage and retrieval circuit 16 is effective to convert the analog video input signal to digital form and for directing the digital signal to a peripheral storage means 18. The peripheral storage means 18 preferably comprises a three megabyte floppy disk. As mentioned above, when the ultrasonic transducer 12 is utilized for diagnostic purposes, 240 records or frames are digitized and stored in the peripheral storage means 18, per patient. The image storage and retrieval means 16 retrieves patient records from the peripheral storage means 18 and converts such records to analog form. The converted analog signals are then directed to output imaging electronics 18, also of conventional design, which converts the signals to a form suitable for display on a cathode ray tube such as shown at 20.

Figure 2:
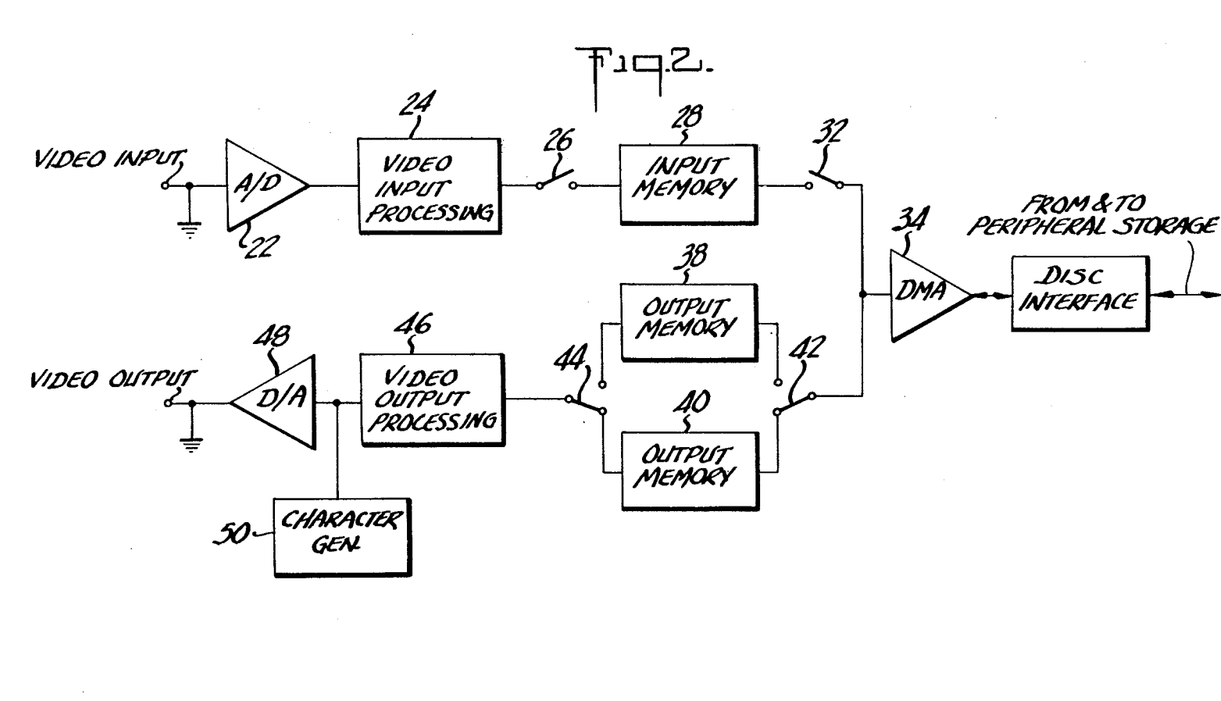
FIG. 2 is a schematic diagram of the image storage and retrieval means of FIG. 1.

Referring now to FIG. 2, the image storage and retrieval means 16 of the present invention will be described in detail. The image storage and retrieval means 16 of the present invention includes an analog-to-digital converter 22 which is responsive to the analog video input signal from the input imaging electronics 14. The analog to digital converter 22 samples the analog video input signal at a rate of, for example, 10 MHz to produce a first digital input signal comprising a first series of amplitude samples representative of the analog input signal. The first series of samples preferably comprises 512 samples of information per line. Each sample comprises a 6-bit value corresponding to an instantaneous amplitude of the analog input signal. The first series of amplitude samples is directed to a video input processing circuit 24 which will be described in detail in connection with FIG. 3 below.

The output of the video input processing circuit 24 is a second digital signal which is directed through a switch 26 to an input memory 28. The output of memory 28 is connected by means of a switch 32 to a direct memory access means 34. When the imaging system of the present invention is in an input mode, switches 26 and 32 store the second digital signal emanating from the video input processing circuit 24 in the input memory 28. After the input memory 28 is filled with one frame of input information, a direct memory access means 34 transfers the stored information from input memory 28 through the disk interface 36 to the peripheral storage means 18. Images are directed to the peripheral storage means 18 at a rate of, for example, four frames per second.

When it is desired to retrieve a patient record from the peripheral storage means 18, the switches 26 and 32 are opened. Retrieved information from the peripheral storage means 18 is thereafter directed through the disk interface 36 and the direct memory access means 34 to either one or the other of output memories 38 and 40, the particular one being determined by the position of the switching means 42. Two memory means 38 and 40 are provided so that retrieval from the storage means 18 to either output memory 38 or 40 can be overlapped in time with the viewing of a previously retrieved image in the alternate output memory 40 or 38. In this way, a continuous visual image is achieved.

When the imaging system of the present invention is operating in an output mode, each of the output memories 38 and 40 contain a second digital signal retrieved from peripheral storage means 18. This retrieved, second digital signal is directed through a switching means 44 to a video output processing circuit 46, which will be described in more detail in connection with FIG. 5 below. The video output processing circuit 46 reconstitutes the first digital signal from the second digital signal input thereto by performing an inverse transform of the type performed in the video input processing circuit 24. The first digital signal output from the video output processing circuit 46 is directed to digital-to-analog converter 48 which produces a video output signal substantially similar to the analog video input signal which was originally received from input imaging electronics 14. The video output signal is an analog signal which is directed to the video display 20 referred to in connection with FIG. 1 above.

In a preferred embodiment of the present invention, the image storage and retrieval means 16 of the present invention further includes a character generating means 50. The digital-to-analog converter 48 is responsive to the character generating means 50 so that alphanumeric information may be simultaneously or sequentially displayed along with patient records.

Figure 3:
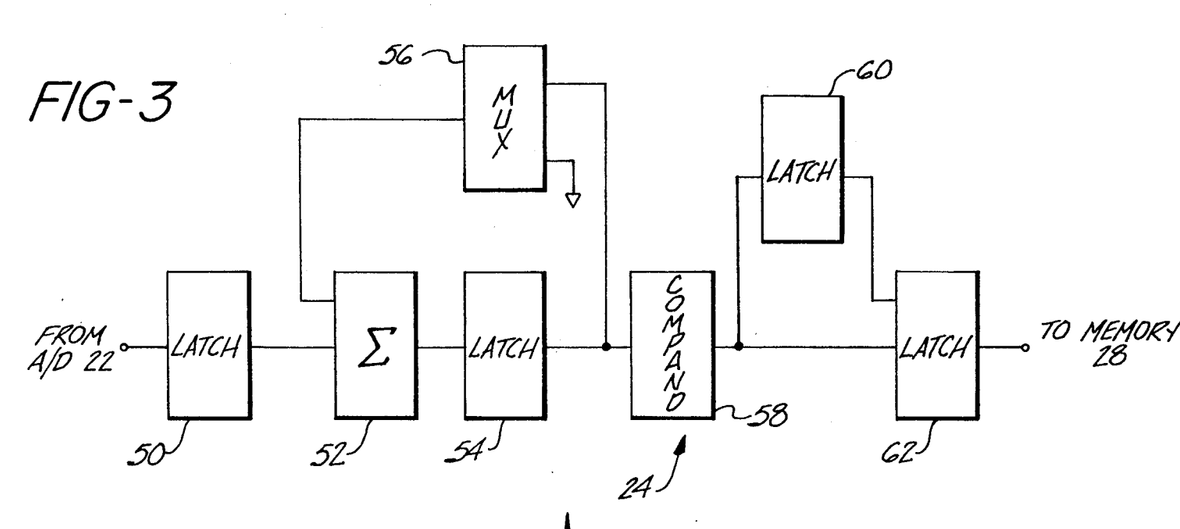
FIG. 3 is a schematic circuit diagram of the video input processing circuit of FIG. 2.

Referring now to FIG. 3, the video input processing circuit 24 shown in FIG. 2 will be described in detail. In accordance with the present invention, the video input processing circuit 24 includes a means for reducing the data density of ultrasonic images in a direction lateral to the axis of the transducer 12. This means includes a first latch 50, a summing means 52, a second latch 54, and a first digital multiplexer 56. The video input processing circuit 24 also preferably includes in accordance with an invention described in detail in copending application Ser. No. 338,731 filed concurrently on Jan. 11, 1982 in the name of Ralph Carmen, entitled IMPROVED ULTRASONIC IMAGE STORAGE DEVICE AND METHOD which is incorporated herein by reference. The video input processing circuit 24 also includes in accordance with the present invention, a companding means 58, a third latch 60 and a fourth latch 62.

In accordance with the present invention the first six-bit sample of the first digital input signal from the analog-to-digital converter 22 is directed to the first latch 50 and from there to the summing means 52, as shown. At the summing means 52, the first six-bit sample of the first digital signal is added to the eight-bit output of the first digital multiplexer 56, which output is initially zero. The eight-bit output of the summing means 52 is directed to a second latch 54, the output of which is directed to an input of the first digital multiplexer 56. The second six-bit sample of the first digital input signal from the analog-to-digital converter 22 is then directed to the latch 50 and from there to the summing means 52, where it is added to the last preceding eight-bit sample of that digital signal from the digital multiplexer 56. After preferably four successive interations, the most significant six bits of the eight bits stored in latch 54 are directed to the companding means 58. These six bits comprise the average of four successive samples of the first digital signal.

Thus, in accordance with the present invention, the analog-to-digital converter 22 provides a first series of amplitude samples. At the output of the latch 54, a second series of digital amplitude samples is provided which is related to the first series. The second series of amplitude samples has fewer elements than the first series since each element, $b_n$, of the second series of amplitude samples is an average of a group of four elements, $a_m$, $a_{m+1}$, $a_{m+2}$, and $a_{m+3}$ of the first series of samples. Since the second series of samples has but one fourth the number of samples than the first series, and since the second series of samples (after companding as explained below) is ultimately stored in storage means 18, memory density is appreciably reduced.

While in the embodiment shown in FIG. 3, each element, $b_n$, of the second series of samples is comprised of the average of four elements $a_m$ through $a_{m+3}$ of the first series of samples, other arrangements are within the scope of the present invention. For example, the output of latch 54 could also comprise the average of some different number of samples from analog-to-digital converter 22 as opposed to the four samples referred to above. Thus, each element of the second series of samples is related to the elements of the first series of samples by the relationship $$b_n = \frac{\sum_{i=0}^{i=k-1} a_{nk-i}}{k}$$

where n is a positive integer identifying each element of the second series of samples and k is the number of elements in each group of elements being summed.

Figure 3A:
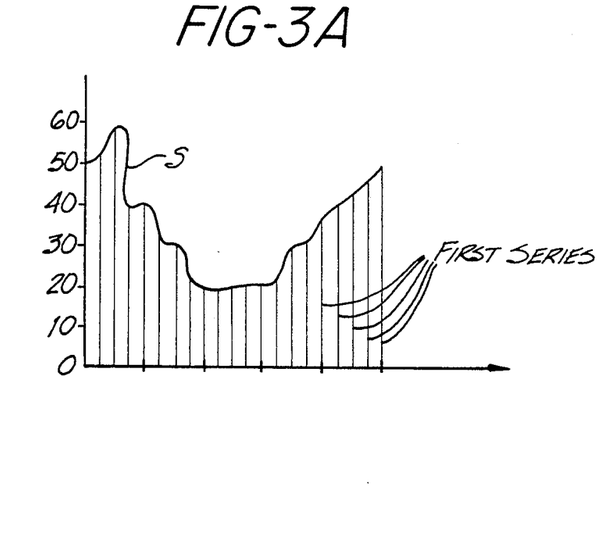
FIG. 3A is a plot of the amplitude of a video input signal versus time at the input of the video input processing circuit of FIG. 2.
Figure 3B:
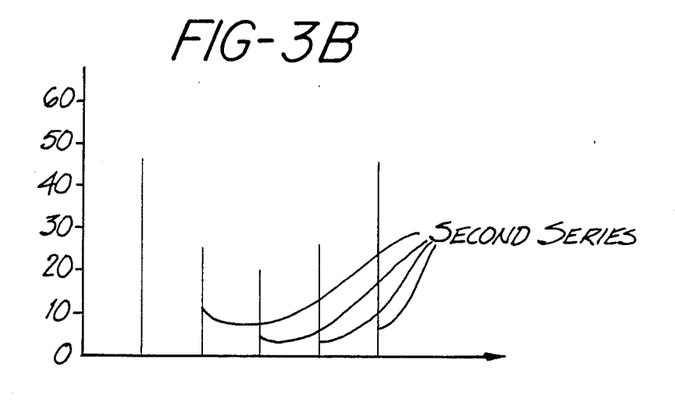
FIG. 3B is a plot of amplitude versus time of the signal at the input to the companding means of FIG. 3.

The operation of the means for reducing data density of ultrasonic images in a direction lateral to the axis of the transducer 12 will be more fully appreciated by reference to FIGS. 3A and 3B. FIG. 3A is a plot of the amplitude versus time of the output of the analog-to-digital converter 22. An analog video input signal S is sampled by the analog-to-digital converter 22 to form the first series of amplitude samples shown in FIG. 3A. However, as may be seen from FIG. 3B, at the output of the latch 54, a second series of amplitude samples is produced, each element of which is an average of a group of samples shown in FIG. 3A. Since the frequency of the analog video input signal S in a direction transverse to the axis of the ultrasonic transducer 12 is relatively low, the second series of amplitude samples shown in FIG. 3B is a reasonably accurate approximation of that video input signal. Since the number of elements in the second series (FIG. 3B) is less than the number of elements in the first series (FIG. 3A) the memory capacity requirements of the peripheral means 18 are substantially reduced.

In accordance with the invention described in Ser. No. 338,731 filed Jan. 11, 1982, the companding means 58 is a random access memory, the output of which is a second digital signal (four bit), the second digital signal being a non-linear function of the samples of the first digital signal input thereto. In this manner, the granularity of the first digital signal is increased in regions of greater diagnostic interest and decreased in regions of lesser interest. The transfer function of the companding means 58 will be described in detail in connection with FIG. 4 below. Since the output of the companding means 58 is a four-bit binary number and since the data format employed by most commonly utilized peripheral storage means is an eight-bit format, the output of the companding means 58 may be converted to an eight-bit format by taking the first four-bit byte from the companding means 58 and storing it in a latch 60. The next four-bit byte from the companding means 58 is immediately directed to the fourth latch (eight bits) 62, wherein the four-bit byte stored in latch 60 is combined to form an eight-bit byte directed to the input memory 28.

Figure 4:
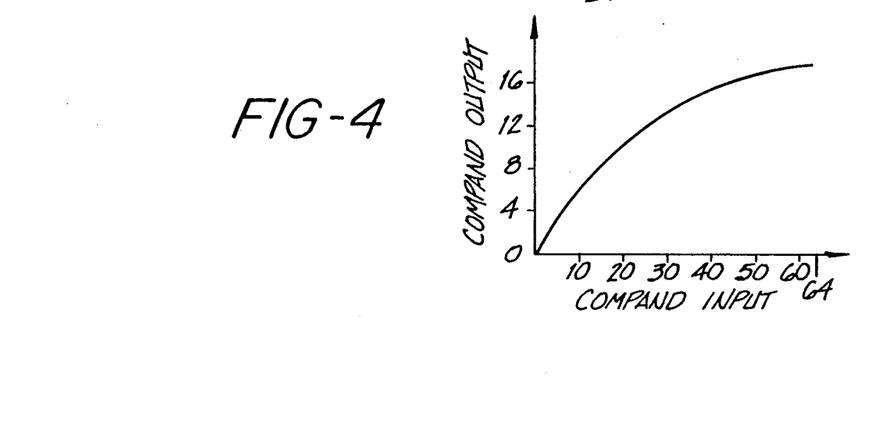
FIG. 4 is a plot of the transfer function of the companding means of the video input processing circuit of FIG. 3.

Referring now to FIG. 4, the transfer function of the companding means 58 will be described in detail. As may be seen in FIG. 4, when the transfer function (compand output versus compand input) is plotted, the plot is a monotonically increasing curve with a monotonically decreasing slope. Utilizing this transfer function, the granularity of low level input signals is increased at the expense of high amplitude level input signals. In this manner, resolution is enhanced for low level signals at the expense of high level signals, low level signals corresponding to areas of possible malignancy. Thus, from FIG. 4, it may be seen that a change in the value of the input to the companding means 58 produces a greater change in the value of the output of the companding means at lower values of the companding means input than at higher values of that input.

Figures 5, 6:
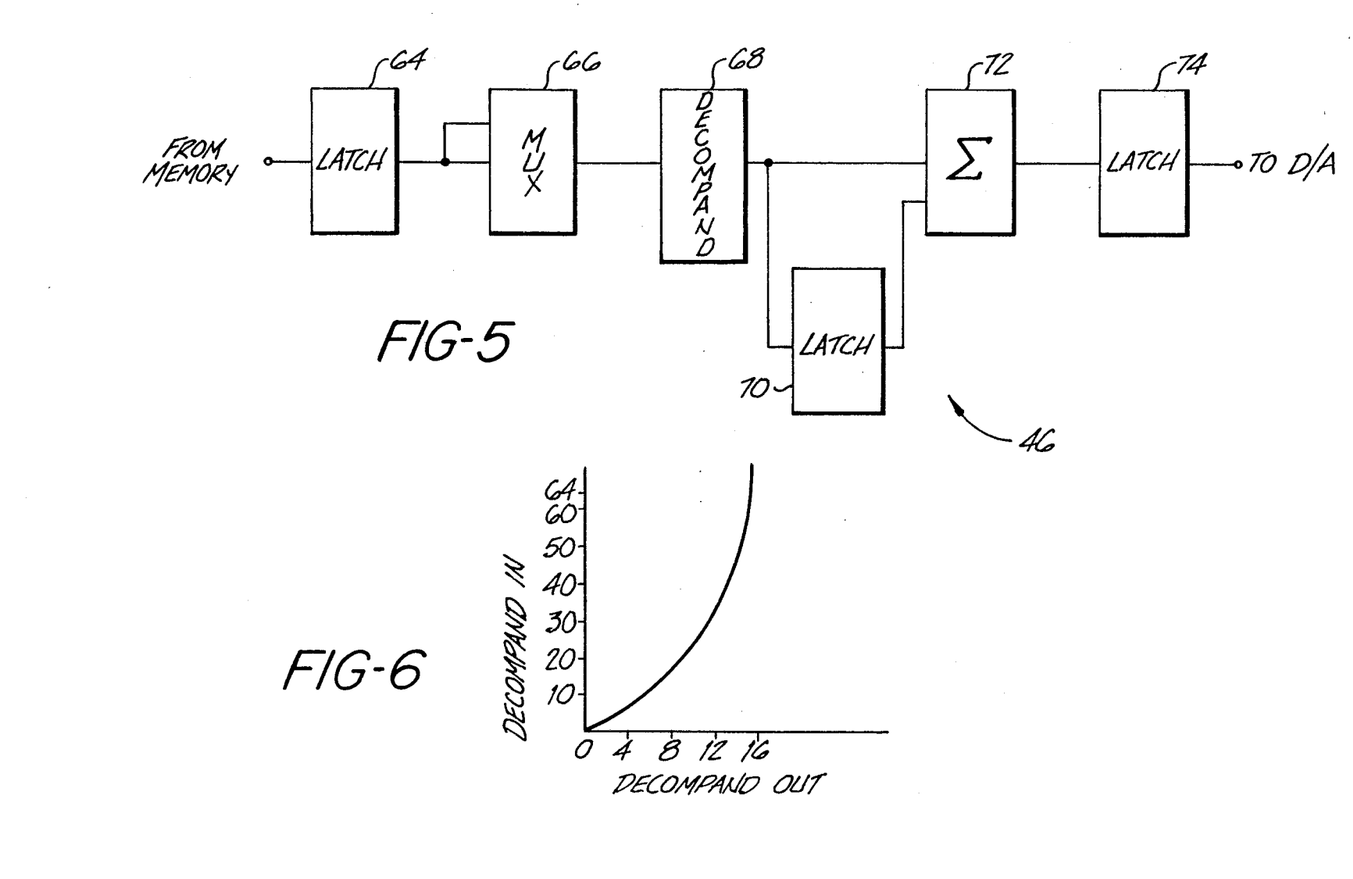
FIG. 5 is a schematic circuit diagram of the video output processing circuit shown in FIG. 2.
FIG. 6 is a plot of the transfer function of the decompanding means of the video output processing circuit of FIG. 5.

Referring now to FIG. 5, the video output circuit 46 will be described in detail. The video output processing circuit includes a latch 64 to which retrieved eight-bit digital information from the peripheral storage means 18 is directed. The digital signal from the latch 64 is directed to a multiplexer 66 in which it is converted to two four-bit bytes. The digital signal from the multiplexer 66 is then directed to the decompanding means 68 in accordance with the invention in copending application Ser. No. 338,731 filed Jan. 11, 1982. The decompanding means is operative to convert the retrieved second digital signal from the storage means 18 to a reconstituted first digital signal. The reconstituted digital signal output from the decompanding means 68 is a non-linear function of the digital signal input thereto. The non-linear transfer function of the decompanding means 68 will be described in detail in connection with FIG. 6 below.

Referring now to FIG. 6, the transfer function of the decompanding means 68 will be seen. As will be seen in FIG. 6, the transfer function of the decompanding means 58 (decompand input versus decompand output) is a monotonically increasing function with a monotonically increasing slope. Thus, the transfer function of the decompanding means 68 is the inverse of the transfer function of the companding means 58. The companding means 58 preferably comprises a random access memory, each value of the second digital signal stored therein being located at an address determined by a value of the first digital signal input thereto. The decompanding means 68 also comprises a random access memory storing the various values of the first digital signal at addresses determined by values of the retrieved second digital signal.

In accordance with the present invention, the output of the decompanding means 68 is directed to a smoothing circuit comprised of a latch 70 and a summing means 72, the output of the summing means then being directed to another latch 74. Each of the latches 70 and 74 are strobed by clock pulses (from a clock means not shown). The latch 74 is strobed at a rate twice that of the rate utilized to strobe latch 70. In this manner, the output of latch 74 is a digital signal comprising a third series of digital samples, each element, $c_n$, of which is related to the elements, $b_m$, of the second series of digital samples by the relationships:

$$c_n = \frac{b\left(\frac{n}{2}\right)}{2}$$

where n is a positive even integer; and $$c_n = \frac{\left[b\left(\frac{n-1}{2}\right) + b\left(\frac{n-1}{2}\right)\right]}{2}$$

where n is a positive odd integer.

Thus, the digital signal emanating from the latch 74, comprises a series of amplitude samples $c_n, c_{n-1} \ldots$, etc., the third series being directed to the digital-to-analog converter 48 where an analog signal suitable for video display is produced.

While a particular embodiment of the present invention has been shown and described in detail, it will, of course, be appreciated by those skilled in the art that various modifications may be made without departing from the spirit and scope of the present invention as defined by the accompanying claims.

What is claimed is:

1. An ultrasonic imaging system for collecting and thereafter displaying body tissue images comprising:
   an ultrasonic transducer;
   input imaging means for converting signals received by said transducer to an analog video input signal;
   means for producing a first series of digital amplitude samples representative of said video input signal;
   means for forming a second series of digital amplitude samples from said first series, each element of said second series being an average of a group of elements from said first series;
   means for storing and retrieving said second series of samples;
   means for converting said retrieved samples to a video output signal substantially similar to said video input signal; and
   display means responsive to said video output signal for producing an image of said tissue.

2. The system of claim 1 wherein said means for forming said second series of samples comprises:
   a means for storing elements of said first series;
   a means for summing each stored element in said group to each other; and
   a means for dividing the output of said summing means by the number of elements in said group.

3. The system of claim 1 wherein said means for forming said second series of samples comprises:
   a means for storing a current sum of the amplitudes of elements in said group;
   a means for adding the amplitudes of one element of said group to said current sum to form an updated sum of said amplitudes;
   a means for storing said updated sum and for incrementing said current sum to equal said updated sum;
   a means for dividing said updated sum by the number of elements in said group after each element in said group has been added to said updated sum.

4. The system of claim 3 wherein said number of elements in said group is equal to 4.

5. A means for digitally storing and retrieving an ultrasonic image comprising:

means for producing a first digital signal representative of said image, said first digital signal comprising a first series of digital amplitude samples;
   means for forming a second series of digital amplitude samples each element of which is an arithmetic average of a group of elements from said first series;
   means for companding said second series of digital samples to produce a second digital signal, said second digital signal being a first non-linear function of said first digital signal;
   means for storing said second digital signal;
   means for retrieving said second digital signal;
   means for decompanding said retrieved second digital signal to reconstitute said first digital signal; and
   means responsive to said decompanding means to produce an analog output signal representative of said ultrasonic image.

6. An ultrasonic imaging system for collecting and thereafter displaying body tissue images comprising:
   an ultrasonic transducer;
   input imaging means for converting signals received by said transducer to an analog video input signal;
   means for producing a first series of digital amplitude samples representative of said video input signal;
   means for forming a second series of digital amplitude samples from said first series, each element, $b_n$, of said second series being the average of a group of elements, $a_m, a_{m-1} \ldots$ of said first series;
   means for storing and retrieving said second series of samples;
   means for converting said retrieved samples to a video output signal substantially similar to said video input signal; and
   display means responsive to said video output signal for producing an image of said tissue.

7. The system of claim 6 wherein each element of said second series is related to elements of said first series by the relationship $$b_n = \frac{\sum_{i=0}^{i=k-1} a_{nk-i}}{k}$$

where n is a positive integer identifying each element of said second series and k is the number of elements in each group.

8. The system of claim 7 wherein k=4.
9. The system of claim 7 wherein k=3.
10. The system of claim 7 wherein k=5.

11. A method of storing and retrieving an ultrasonic image comprising the steps of:
   providing an analog video input signal representative of said image;
   converting said analog video input signal to a first series of digital amplitude samples;
   forming a second series of digital amplitude samples from said first series, each element, $b_n$, of said second series being the average of a group of elements, $a_m, a_{m-1} \ldots$ of said first series;
   storing said second series of samples in a memory;
   retrieving said stored samples from said memory;
   converting said retrieved samples to a video output signal for video display of said image.

12. The method of claim 1 wherein each element of said second series is related to elements of said first series by the relationship $$b_n = \frac{\sum_{i=o}^{i=k-1} a_{nk-i}}{k}$$

where n is a positive integer identifying each element of said second series and k is the number of elements in each group.

13. The method of claim 2 wherein k=4.
14. The method of claim 2 wherein k=3.
15. The method of claim 2 wherein k=5.